(12) United States Patent
Secretin (10) Patent No.: US 11,792,552 B2
(45) Date of Patent: Oct. 17, 2023

(54) METHOD FOR OBTAINING INFORMATION ABOUT A LUMINAIRE

(71) Applicant: Schreder S.A., Brussels (BE)

(72) Inventor: Laurent Secretin, Rémicourt (BE)

(73) Assignee: Schreder S.A., Brussels (BE)

( * ) Notice: Subject to any disclaimer, the term of this patent is extended or adjusted under 35 U.S.C. 154(b) by 285 days.

(21) Appl. No.: 15/733,610

(22) PCT Filed: Mar. 18, 2019

(86) PCT No.: PCT/EP2019/056723
§ 371 (c)(1),
(2) Date: Sep. 15, 2020

(87) PCT Pub. No.: WO2019/175439
PCT Pub. Date: Sep. 19, 2019

(65) Prior Publication Data
US 2021/0042525 A1    Feb. 11, 2021

(30) Foreign Application Priority Data

Mar. 16, 2018 (BE) .................................. 2018/5176

(51) Int. Cl.
*G06V 20/20*        (2022.01)
*H04Q 9/00*         (2006.01)
(Continued)

(52) U.S. Cl.
CPC ............ *H04Q 9/00* (2013.01); *G06V 20/20* (2022.01); *H04W 24/00* (2013.01); *H04W 64/006* (2013.01); *H05B 47/19* (2020.01)

(58) Field of Classification Search
None
See application file for complete search history.

(56) References Cited

U.S. PATENT DOCUMENTS

2010/0161658 A1    6/2010   Hamynen et al.
2019/0042845 A1*   2/2019   Perkins ................. G06F 16/907

FOREIGN PATENT DOCUMENTS

WO         2016193199 A1    12/2016

OTHER PUBLICATIONS

Yang et al., "Cloud Server Software Design of Street Light Management System", 2017. (Year: 2017).*
(Continued)

*Primary Examiner* — Nicholas R Wilson
(74) *Attorney, Agent, or Firm* — McDonnell Boehnen Hulbert & Berghoff LLP (57) ABSTRACT

A method for obtaining information about a luminaire of a plurality of luminaires, using a mobile device with a display, a camera, a localization unit and a wireless communication means, said method comprising the following steps performed by the mobile device: capturing an image of the luminaire using the camera and displaying said image of the luminaire on the display; obtaining localization information of the mobile device using the localization unit; transmitting the localization information to a remote device storing information of the plurality of luminaires; receiving from said remote device information related to one or more luminaires selected by the remote device based on the localization information; displaying on the display of the mobile device luminaire data of the luminaire in the captured image based on the received information.

19 Claims, 5 Drawing Sheets

(51) Int. Cl.
*H05B 47/19* (2020.01)
*H04W 24/00* (2009.01)
*H04W 64/00* (2009.01)

(56) References Cited

OTHER PUBLICATIONS

PCT International Search Report and Written Opinion, PCT International Application No. PCT/EP2019/056723, dated Apr. 10, 2019.

* cited by examiner

METHOD FOR OBTAINING INFORMATION ABOUT A LUMINAIRE

CROSS-REFERENCE TO RELATED APPLICATION

The present application is a national stage entry of PCT/EP2019/056723 filed on Mar. 18, 2019, which claims priority to BE 20185176, filed on Mar. 16, 2018, the contents of each of which are hereby incorporated by reference.

FIELD OF INVENTION

The field of invention relates to methods and systems for obtaining information about a luminaire, in particular an outdoor luminaire such as outdoor luminaire for street lights.

BACKGROUND

It is known to store data about luminaires in a central server. Further, it is known to store data of a luminaire locally in the luminaire. Typical data which are stored for a luminaire may comprise e.g. an identification of the luminaire, an operating time of the luminaire (i.e. the number of hours that the luminaire has been running), a type of luminaire, a number and/or a type of light emitting elements in the luminaire, a driver type used in the luminaire, a dimmer type used in the luminaire, dimming profiles in function of time, lumen data, localization coordinates, etc. However, according to prior art, methods and systems obtaining such data may be cumbersome.

SUMMARY

The object of embodiments of the invention is to provide methods, devices and computer programs allowing to obtain information about a luminaire of a plurality of luminaires in an improved manner, and more in particular, in a faster and more intuitive manner.

According to a first aspect of the invention, there is provided a method for obtaining information about a luminaire of a plurality of luminaires using a mobile device. The mobile device is provided with a display, a camera, a localization unit and a wireless communication means. The method comprises the following steps performed by the mobile device:
  capturing an image of the luminaire using the camera and displaying said image of the luminaire on the display;
  obtaining localization information of the mobile device using the localization unit;
  transmitting the localization information to a remote device storing information of the plurality of luminaires;
  receiving from said remote device information related to one or more luminaires selected by the remote device based on the localization information;
  displaying on the display of the mobile device luminaire data of the luminaire in the captured image based on the received information.

It is noted that the meaning of the capturing of an image includes taking a picture or a video of the luminaire, as well as pointing the camera towards the luminaire in order to obtain a live feed on the screen of the mobile device, without actually "taking" a picture or a video, wherein image data is only temporarily buffered in the mobile device. The second meaning of the capturing of an image may be referred to as dynamic capturing, or real time capturing, or live recording.

It is further noted that the capturing of an image and the obtaining of localization information may be done in parallel or subsequently, wherein the capturing may be done before the obtaining of localization information or after the obtaining of localization information.

Further, the transmitting of localization information to the remote device may be done upon request of a user of the mobile device, or may be done automatically, e.g. periodically, when an appropriate application on the mobile device is running.

Further, the receiving from the remote device of information related to one or more luminaires selected by the remote device based on the localization information may comprise receiving information of only one luminaire, where the remote device is capable or configured to select e.g. the luminaire which is closest to the mobile device, may comprise receiving information from a number of luminaires of the neighbourhood of the mobile device, in which case the mobile device itself may determine which one of the luminaires corresponds to the luminaire in the image, using e.g. image processing techniques. Said image processing techniques may recognize any one of the following: a shape of the luminaire, dimensions of the luminaire, a distance from the mobile device to the luminaire, a color of the luminaire, a brand of the luminaire, a change of light intensity such as a blink or a flashing pattern of a light source of the luminaire, a serial number of the luminaire, a quick response (QR) code on a housing or support pole or pole module of the luminaire, etc.

The displaying comprises displaying luminaire data of the luminaire in the captured image based on the received information. For example, depending on settings in the mobile device, all received information with respect to the luminaire and the captured image may be displayed, or a portion of the received information. Further, the received information may be converted in a suitable format for displaying.

Using embodiments of the invention, an operator walking in the neighbourhood of a luminaire about which he wants to have more information, can easily point with his mobile device to a luminaire such that an image of the luminaire is captured using the camera of the mobile device. When the mobile device is performing the above mentioned steps, information about the luminaire will be displayed to the user, resulting in a fast and easy way for obtaining information about the luminaire compared to prior art solutions, where databases need to be consulted by the user.

In a preferred embodiment, the displaying comprises displaying the luminaire data as an overlay on the captured image. In other words, the real representation of the luminaire in the image is augmented with an overlay representing the luminaire data in a graphical way.

According to an exemplary embodiment, the method further comprises the step of determining in the mobile device, based on the received information related to one or more luminaires, and based on the captured image, which luminaire of the one or more luminaires corresponds to the luminaire in the captured image. The displaying may then comprise displaying luminaire data of the determined luminaire. Such an embodiment may be advantageous when many luminaires are present in the neighbourhood of the mobile device. Using e.g. image processing techniques, information can be derived from the captured image allowing to determine which of the one or more luminaires corresponds to the luminaire in the captured image.

Alternatively or in addition, the method may further comprise the step of determining a moving direction and/or an orientation of the mobile device, and of determining, based on the moving direction and/or the orientation and the received information related to the one or more luminaires, which luminaire of the one or more luminaires corresponds to the luminaire in the captured image. Indeed, typically a user who wants to obtain information about a particular luminaire will move the mobile device in the direction of that luminaire. Based on the GPS coordinates of the mobile device, the moving direction and/or the orientation, and the GPS coordinates of the one or more luminaires close to the mobile device, it can then be determined which one thereof corresponds to the luminaire in the captured image. The orientation of the mobile device can be acquired thanks to e.g. a gyroscope, a digital compass, a level, an accelerometer, a proximity detector (RF ID tag, short-range radio receiver, IR detector) embedded in the mobile device. The orientation of the mobile device relative to the earth surface may be determined e.g. via a compass heading of the camera and/or by determining one or more rotation angles of the mobile device relative to the earth's surface. Also here the displaying comprises displaying luminaire data of the determined luminaire. In yet another embodiment, the moving direction and/or orientation of the mobile device may be determined in the remote device based on a plurality GPS coordinates of the mobile device and/or a plurality of captured images sent by the mobile device to the remote device.

In the embodiments above, it is assumed that the determining is done in the mobile device. However, in other embodiments, the determining or a portion of the determining may be done in the remote device as will be discussed below.

According to another aspect of the invention, there is provided a method for obtaining information about the luminaire which comprises the following steps performed by the remote device:
  storing information of the plurality of luminaires together with localization information for each luminaire of the plurality of luminaires;
  receiving localization information of the mobile device;
  selecting information related to one or more luminaires of the plurality of luminaires based on the received localization information;
  transmitting the selected information to the mobile device.

In other words, the remote device will select one or more luminaires of the plurality of luminaires based on the position of the mobile device and on the localization information of the plurality of luminaires which is available in the remote device.

In a preferred embodiment, the selecting comprises selecting one or more luminaires which are closest to the mobile device. More in particular, the remote device may be configured to select only one luminaire which is closest to the mobile device, or it may be configured to select a number of luminaires which are closest to the mobile device, especially for areas where the luminaires are located close to each other.

In an exemplary embodiment, the method performed at the remote device may further comprise receiving the captured image of the luminaire from the mobile device. The selecting may then be further based on the captured image, using e.g. image processing techniques. Said image processing techniques may recognize any one of the following: a shape of the luminaire, dimensions of the luminaire, a distance from the mobile device to the luminaire, a color of the luminaire, a brand of the luminaire, a change of light intensity such as a blink or a flashing pattern of a light source of the luminaire, a serial number of the luminaire, a quick response (QR) code on a housing or support pole or pole module of the luminaire, etc. For example, in the event that more than one luminaire is close to the mobile device, the selecting may be further based on the captured image of the luminaire in order to determine which one thereof corresponds to the luminaire in the captured image. Hence, the selecting may comprise determining, based on the received localization information of the mobile device, and based on the received captured image from the mobile device, which luminaire of the one or more luminaires corresponds to the luminaire in the captured image, and the transmitting may comprise transmitting information related to the determined luminaire to the mobile device.

Alternatively or additionally to the selecting based on the captured image, the method performed at the remote device may further comprise the step of receiving a moving direction and/or an orientation of the mobile device. The selecting may then be further based on the received moving direction and/or the orientation. Also this embodiment may be advantageous when more than one luminaire is close to the mobile device, and the selecting may be further based on the moving direction and/or the orientation of the mobile device in order to determine which luminaire of the one or more luminaires corresponds to the luminaire in the captured image. Hence, the selecting may comprise determining, based on the received localization information of the mobile device, and based on the received moving direction and/or orientation of the mobile device, which luminaire of the one or more luminaires corresponds to the luminaire in the captured image, and the transmitting may comprise transmitting information related to the determined luminaire to the mobile device.

In embodiments of the invention, the information of one or more luminaires may comprise any one of the following for each luminaire thereof: an identification, an operating time (the number of hours that a luminaire has been running), a type, a number and/or type of light emitting elements in the luminaire, a driver type used in the luminaire, a dimmer type, failure information, a dimming profile as a function of time, lumen data, localization coordinates, an optical element type such as a lens type used in the luminaire, a light distribution of the luminaire, diagnostics and/or operating status data with respect to a component (e.g. a sensor or any other type of functional unit, e.g. a base station unit) of the luminaire, data sensed by a sensor of the luminaire, a time stamp associated with any one or more of the above-mentioned information. The diagnostics and/or operating status data may comprise any one or more of the following data: an operating temperature of the luminaire, a level of vibrations undergone by the luminaire, a level of operating power of the luminaire, a number of switch-off and/or switch-on states of the luminaire, a number of operating light elements of the light source, an operating state of a surge protection device in the luminaire, an operating time of the luminaire, failure information of the luminaire such as a power supply failure signal, dimming profile data, light source failure data, calibration data, energy consumption data, etc. The luminaire may comprise any one or more of the following sensors: a camera, a microphone or other sound sensor, a photosensitive sensor, an accelerometer, a wind sensor, a heat/thermal sensor, a thermometer, an RF sensor, an electromagnetic sensor, a smoke sensor, a dust sensor, an air quality sensor, a visibility sensor, a humidity sensor, an IR sensor, a motion sensor, an (ultra)sonic sensor, a microwave sensor, another type of environmental sensor, a radar or lidar based sensor, etc.

Some of the above-mentioned luminaire information may comprise dynamic data, meaning that they are not necessarily frozen data and that they can evolve/change overtime, e.g. depending on a moment in a day and/or depending on a specific day. With this respect, in further developed embodiments the mobile device may be configured to provide a user with a user interface allowing the user to select a time frame for which the user would like to obtain the information. Indeed, said user might not necessarily want to always know the last updated information, but rather the information at a specific date, or at a specific moment of a day. In that case, when the selecting is done at the remote device, also the time frame input by the user may be sent to the remote device. Alternatively, the selecting of the information corresponding with the time frame input by the user may be done in the mobile device.

In further developed embodiments, the mobile device may indicate to the remote device which information it would like to get. For example, the mobile device may indicate that it wishes to obtain the full set of information with respect to the closest luminaire, or that it wishes to obtain only a subset of that information. To that end, the mobile device may store user settings indicating which type of information the operator or user would like to see.

In further developed embodiments, the mobile device may use the information about the one or more selected luminaires in order to perform actions on said one or more selected luminaires, such as control actions. For example, the mobile device may switch one or more selected luminaires in power-off mode or stand-by mode based on e.g. information about the operating time of the one or more selected luminaires, or may adjust the light distribution of the one or more selected luminaires based on e.g. information about the light distribution of the one or more selected luminaires, or may adjust the light intensity of the one or more selected luminaires based on e.g. information about the dimming profile as a function of time or lumen data of that one or more selected luminaires. Hence, in these further developed embodiments there may be provided a control interface between the mobile device and the one or more selected luminaires. In this way, a triangular communication between a luminaire, a mobile device, and a remote device is enabled. For example, the remote device may cause the luminaires which are closest to the mobile device to change the emitted light, e.g. to change their light intensity and/or a color of the light emitted, and/or a flashing pattern (e.g. the luminaires may blink one after the other). Optionally, the mobile device may be configured to select a luminaire based on this emitted light, and may further control said selected luminaire.

Another possible control action may be to overwrite the information of a luminaire stored in the remote server via the mobile device. For example, according to the present invention a user may obtain information on the dimming profile and/or light distribution of a specific luminaire and realize that said dimming profile and/or light distribution is not the most appropriate profile due to a specific environment condition in a vicinity of the luminaire. Thus, the user may change the dimming profile and/or the light distribution via the mobile device.

According to another example, the light distribution may be changed. A possible action may be to mechanically change the light distribution. This may be done e.g. by changing a position and/or a shape of an optical element (such a lens and/or reflector) and/or by changing a position of a support, typically a PCB, on which light sources, typically LEDs, are arranged, and/or by changing the inclination of the luminaire head (with respect to the pitch and/or level axis). This can be done manually by an operator or this can be done remotely by suitably controlling an actuator within the luminaire head. For example, the mobile device may provide the user with a user interface allowing a user to input a desired change of the light distribution, whereupon this input is communicated by the mobile device to the remote device. The remote device may then remotely control an actuator of the luminaire to perform the desired change. The user interface may be an intuitive user interface e.g. allowing a user to modify a size and/or shape of the light beam directly on the captured image of the luminaire displayed on the mobile device. After the change, a database storing information about the light distribution of the luminaire may be updated.

According to another example a defective luminaire may be detected, e.g. by allowing a user of the mobile device to input through a user interface that the luminaire displayed on the mobile device is defective, whereupon this input may be send by the mobile device to the remote device. This may trigger an operator to repair the luminaire. In other words, embodiments of the invention may help in identifying in the field a defective luminaire. Once repaired the status of the luminaire may be change in a database.

In yet another exemplary embodiment, the remote device may be detecting a defective luminaire based on information received from the luminaire, such as diagnostic or failure data sent by the luminaire to the remote device. This will trigger a repair of the luminaire on site by an operator. However it might be difficult for the operator to know, once on site, which luminaire on the street he has to repair, only based on GPS data for example. To help the operator identifying the defective luminaire detected by the remote device, actions could be taken via the mobile device. For example, the mobile device may provide the operator with a user interface allowing the operator to request a certain action to be able to identify the luminaire, e.g. to make the defective luminaire blink. Then, once repaired, the operator may use the mobile device to update the status of the luminaire in the remote device.

In embodiments of the invention, the mobile device may be any one of the following: smartphone, tablet, laptop, netbook, e-reader, smart watch, a wearable device.

In embodiments of the invention, the remote device may be any one of the following: a server, a controller, a controller within the luminaire, a controller in a neighbouring luminaire at a distance of the luminaire. The remote device stores information of the plurality of luminaires together with localization information for each luminaire of the plurality of luminaires. Hence, the remote device of the present invention is configured to centralize information about a plurality of luminaires. It is noted that the method steps performed at the remote device may be performed in the cloud, so to speak. In other words, the method steps performed by the remote device may be performed on a plurality of servers or on a single central server.

According to a further aspect of the invention, there is provided a computer program comprising computer executable instructions to perform any one of the embodiments of the methods disclosed above, when the program is run on a computer. According to another aspect of the invention, there is provided a computer device or other hardware device programmed to perform one or more steps of any one of the embodiments of the methods disclosed above.

According to yet another aspect, there is provided a data storage device encoding a program in machine readable and machine executable form to perform one or more steps of any one of the embodiments of the methods disclosed above. Further, the invention relates to a mobile device encoding a machine executable program of instructions to perform any one of the method steps performed by the mobile device. Also, the invention relates to a controller or server storing computer executable instructions for performing any one of the method steps performed by the remote device, when the program is run on a computer.

Embodiments of the invention are particularly useful for outdoor luminaires. By outdoor luminaires, it is meant luminaires which are installed on roads, tunnels, industrial plants, campuses, parks, cycle paths, pedestrian paths or in pedestrian zones, for example, and which can be used notably for the lighting of an outdoor area, such as roads and residential areas in the public domain, private parking areas and access roads to private building infrastructures, etc.

BRIEF DESCRIPTION OF THE FIGURES

The accompanying drawings are used to illustrate presently preferred non-limiting exemplary embodiments of methods and systems of the present invention. The above and other advantages of the features and objects of the invention will become more apparent and the invention will be better understood from the following detailed description when read in conjunction with the accompanying drawings, in which.

DESCRIPTION OF EMBODIMENTS

Figure 1:
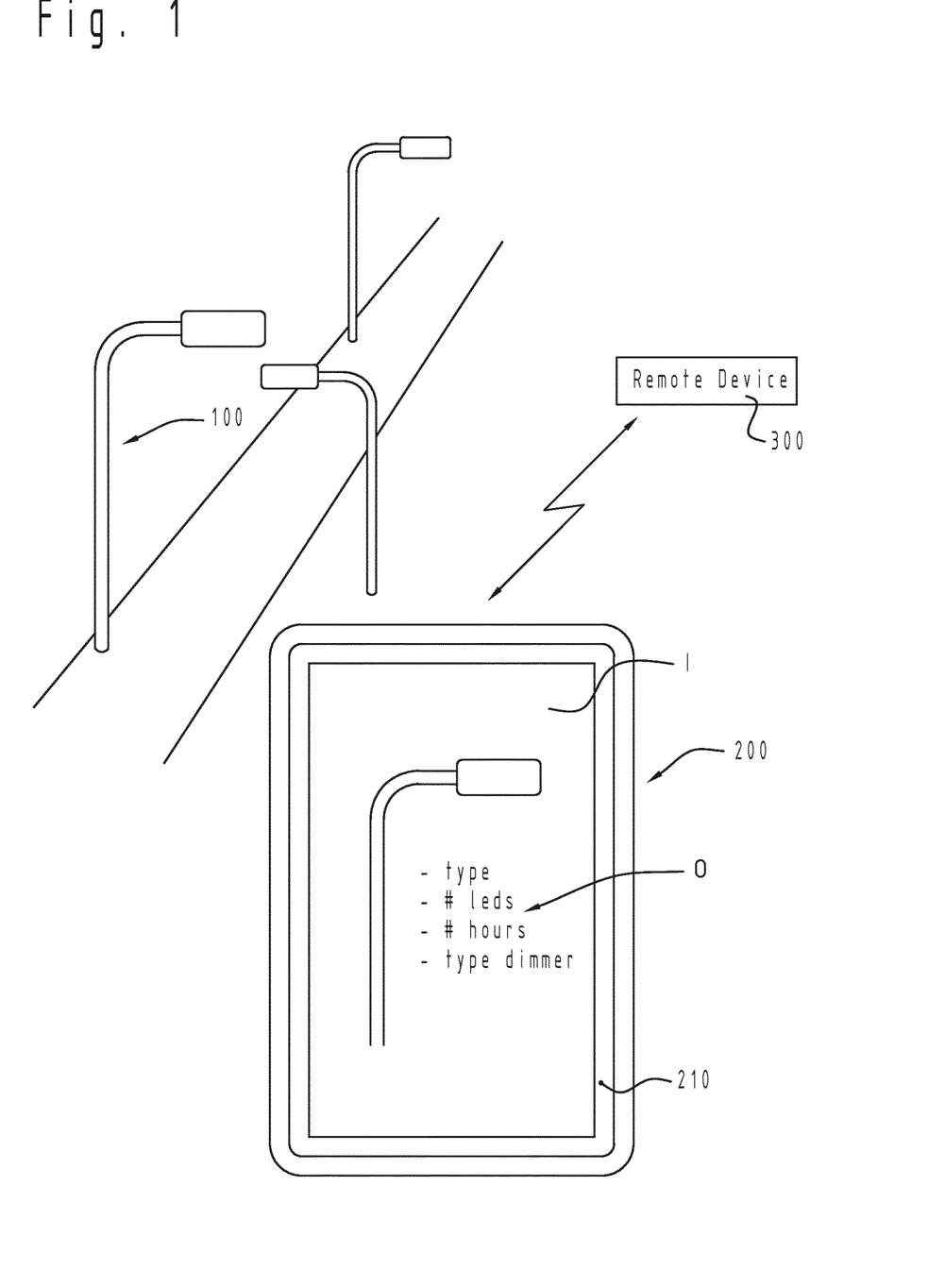
FIG. 1 is a schematic view illustrating an exemplary embodiment of the method and system.
Figure 2:
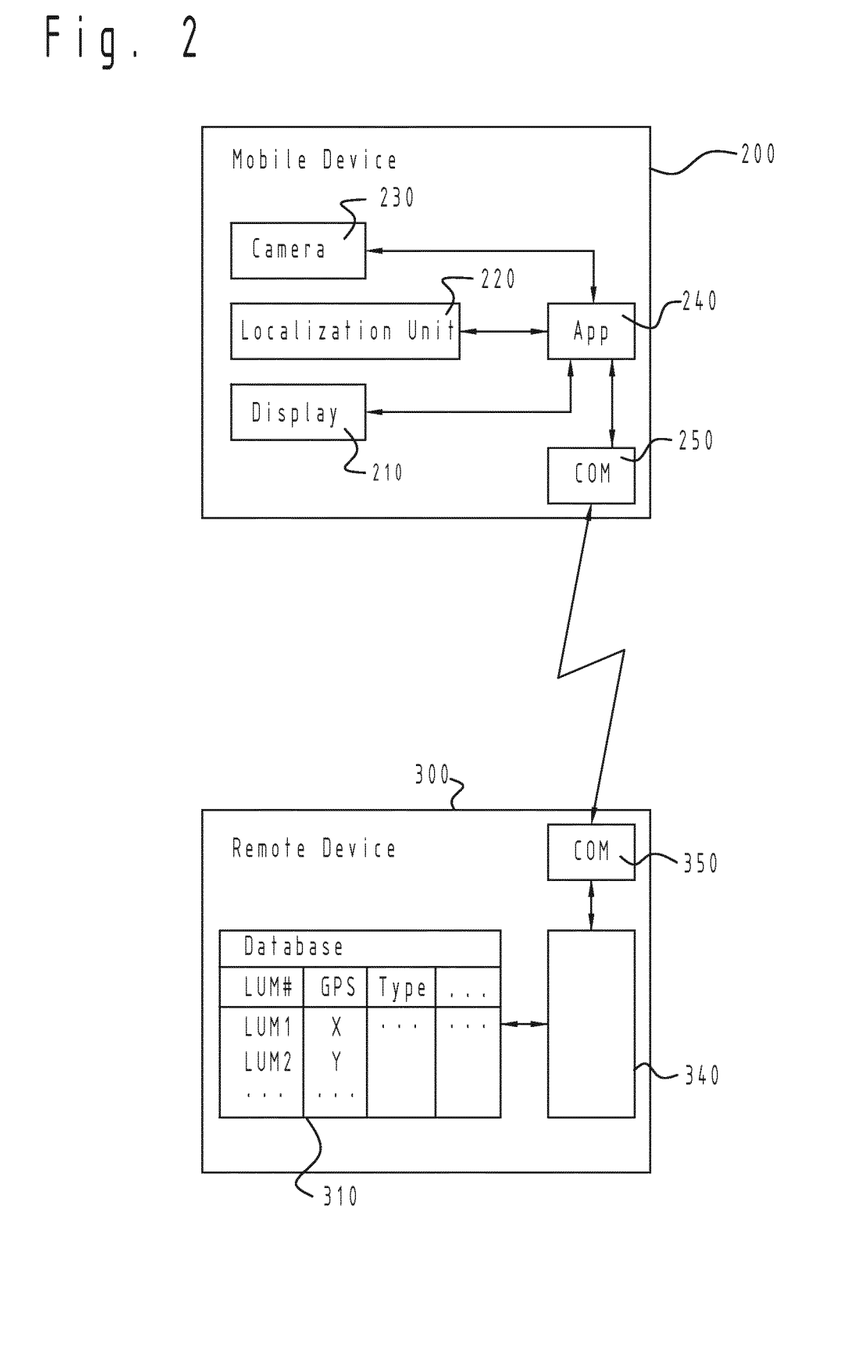
FIG. 2 is a schematic view of the different components of a mobile device and a remote device for use with embodiments of the method and system.

FIG. 1 illustrates an area with a plurality of luminaires. For reasons of simplicity only three luminaires are shown: two luminaires on the same side of a street, and a third luminaire on the other side of the street. It is assumed that an operator wishes to obtain information about a luminaire 100 of the plurality of luminaires, using his mobile device 200. As illustrated in FIG. 2, the mobile device 200 is provided with a display 210, a camera 230, a localization unit 220, typically a GPS receiver unit, and wireless communication means 250. Further, the mobile device 200 stores an application program 240 configured to perform the steps of an exemplary embodiment of the method as will be set out in detail below with reference to FIG. 3. The mobile device 200 is configured to communicate with a remote device 300. The remote device 300 stores information of the plurality of luminaires together with localization information for each luminaire of the plurality of luminaires.

For example, as illustrated in FIG. 2, the remote device 300 may store a database comprising for each luminaire of the plurality of luminaires the following information: an identification of the luminaire (LUM1, LUM2, etc.), GPS coordinates of the luminaire (indicated in FIG. 2 as X, Y, etc.), a type of luminaire, an operating time of the luminaire (i.e. the number of hours that the luminaire has been in operation), the number and/or type of light emitting elements included in the luminaire, the driver type of the driver used in the luminaire, a dimmer type of the luminaire, failure information of the luminaire, a dimming profile as a function of time, lumen data, an optical element type such as a lens type used in the luminaire, a light distribution, diagnostics and/or operating status data with respect to a component of the luminaire, data sensed by a sensor of the luminaire, a time stamp associated with any one or more of the above-mentioned information, etc. The diagnostics and/or operating status data may comprise any one or more of the following data: an operating temperature of the luminaire, a level of vibrations undergone by the luminaire, a level of operating power of the luminaire, a number of switch-off and/or switch-on states of the luminaire, a number of operating light elements of the light source, an operating state of a surge protection device in the luminaire, an operating time of the luminaire, failure information of the luminaire such as a power supply failure signal, dimming profile data, light source failure data, calibration data, energy consumption data, etc. The luminaire may comprise any one or more of the following sensors: a camera, a microphone or other sound sensor, a photosensitive sensor, an accelerometer, a wind sensor, a heat/thermal sensor, a thermometer, an RF sensor, an electromagnetic sensor, a smoke sensor, a dust sensor, an air quality sensor, a visibility sensor, a humidity sensor, an IR sensor, a motion sensor, an (ultra)sonic sensor, a microwave sensor, another type of environmental sensor, a radar or lidar based sensor, etc.

It is noted that the remote device 300 may be a central server or controller, or a gateway, but may also be a controller present in one of the luminaires of the plurality of luminaires, provided that the remote device 300 stores information of the plurality of luminaires together with localization information for each luminaire of the plurality of luminaires. Hence, the remote device 300 is configured to centralize information about a plurality of luminaire, not about a single luminaire.

Figure 3:
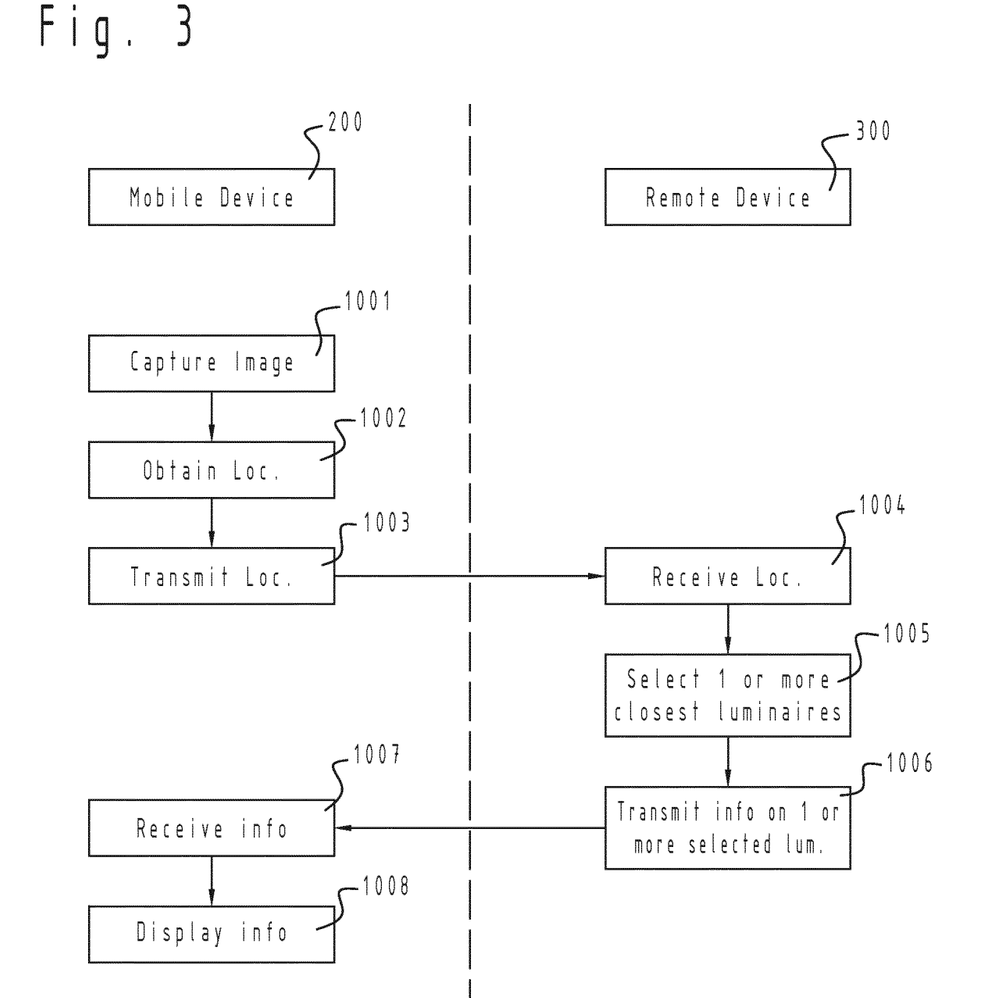
FIG. 3 is a schematic diagram illustrating the method steps performed by the mobile device and the method steps performed by the remote device according to an exemplary embodiment.

FIG. 3 illustrates both the method steps performed by the mobile device and the method steps performed by the remote device, according to an exemplary embodiment.

The mobile device 200 captures an image of the luminaire using the camera of the mobile device 200, and displays the image of the luminaire on the display of the mobile device 200, see step 1001. Further, the mobile device 200 obtains localization information of the mobile device using the localization unit, see step 1002. It is noted that steps 1001 and 1002 may be performed simultaneously or one after the other in any order, i.e. step 1002 may also be performed before step 1001.

In step 1003 the obtained localization information is transmitted to a remote device 300, and in step 1004 the transmitted localization information is received at the remote device 300.

In step 1005, using e.g. the database shown in FIG. 2, the remote device 300 selects information related to one or more luminaires of the plurality of luminaires based on the received localization information. For example, the remote device 300 may select one or more luminaires which are closest to the mobile device 200.

In step 1006, the remote device 300 transmits the information related to the one or more luminaires to the mobile device 200. For example, if one luminaire is selected as being the closest to the mobile device 200, the remote device 300 may send e.g. an identification of that luminaire, an operating time of that luminaire, a number and/or type of light emitting elements included in that luminaire, etc. In further developed embodiments, the mobile device 200 may indicate to the remote device 300 which information it would like to get. For example, the mobile device 200 could indicate that it wishes to obtain the full set of information with respect to the closest luminaire, or that it wishes to obtain only a subset of that information. To that end, the mobile device 200 may store user settings indicating which type of information the operator would like to see.

The mobile device 200 may also be configured to provide the user with a user interface allowing the user to input details about the data he would like to receive and/or allowing the user to input desired changes to settings of the luminaire. For example, the user interface may be configured to allow a user to select the data and/or a time frame for the data he wishes to be displayed on the mobile device, e.g. energy consumption data for a certain period of time, dimming profile data for a certain period of time, sensed data (e.g. air quality data sensed by an air quality sensor or light data sensed by a light sensor of the luminaire) for a certain period of time, diagnostics and/or operational status information for a certain period time, etc. Also, for example, the user interface may be configured to allow the user to input desired changes to settings of the luminaire, e.g. a user interface to change the dimming profile, a user interface to change the light distribution, a user interface to change settings of a sensor, etc.

In step 1007, the information about the one or more selected luminaires is received at the mobile device 200. Next, in step 1008, luminaire data of the luminaire included in the captured image is shown on the display of the mobile device 200, preferably as an overlay on the captured image. In further developed embodiments, the mobile device 200 may use the information about the one or more selected luminaires in order to perform actions on said one or more selected luminaires, such as control actions. For example, the mobile device 200 may switch one or more selected luminaires in power-off mode or stand-by mode based on e.g. information about the operating time of that one or more selected luminaires, or may adjust the light distribution of the one or more selected luminaires based on e.g. information about the light distribution of that one or more selected luminaires, or may adjust the light intensity of the one or more selected luminaire based on e.g. information about the dimming profile as a function of time or lumen data of that one or more selected luminaire. Hence, in these further developed embodiments there may be provided a control interface between the mobile device 200 and the one or more selected luminaire. In this way, a triangular communication between a luminaire 100, a mobile device 200, and a remote device 300 is enabled. For example, the remote device 300 may cause the luminaires which are closest to the mobile device 200 to change their light intensity and/or a color of the light emitted, or a flashing pattern (e.g. the luminaires may blink one after the other), and the mobile device 200 may select a luminaire based on this action, and may further control said selected luminaire.

Figure 4:
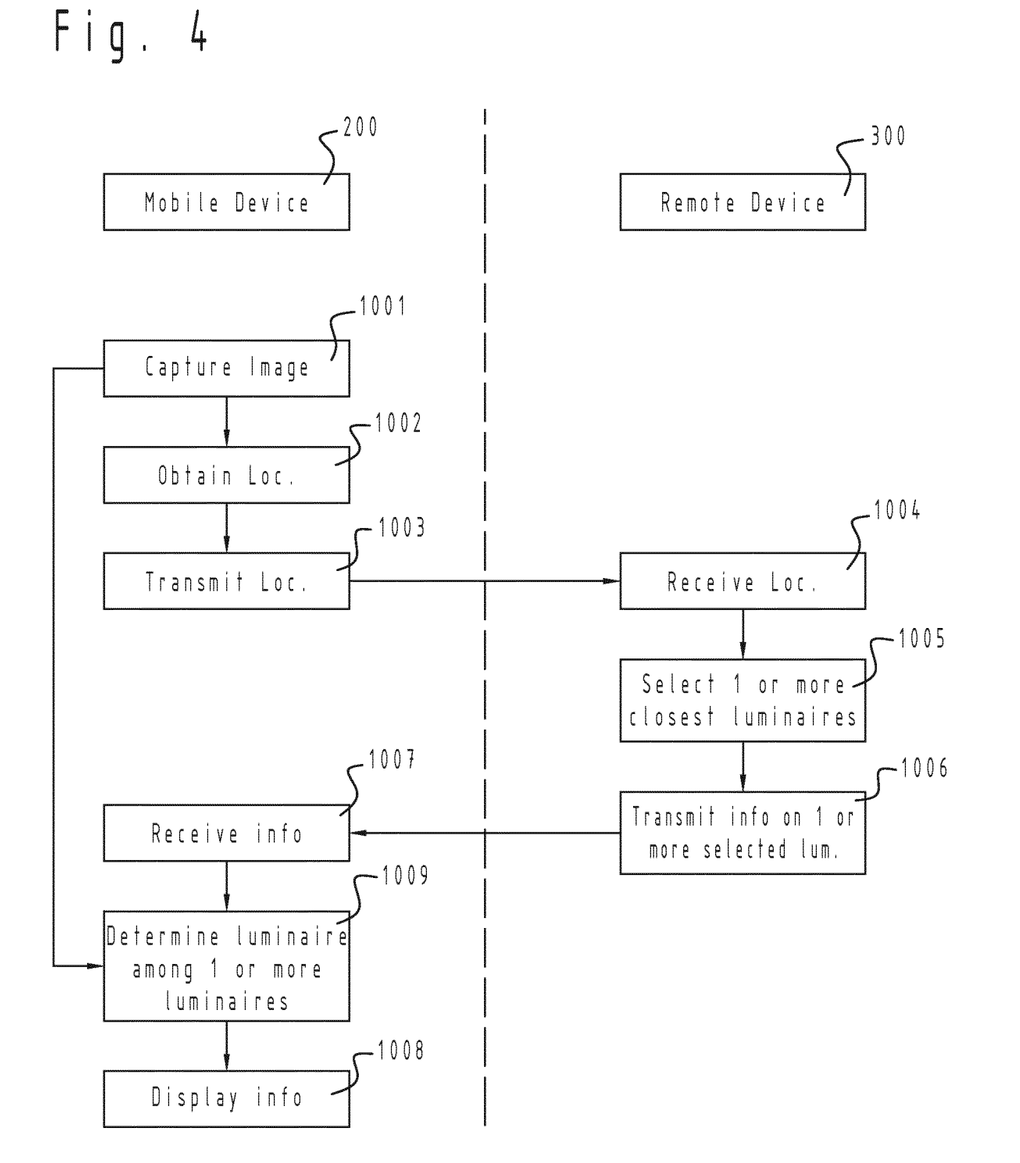
FIG. 4 is a schematic diagram illustrating the method steps performed by the mobile device and the method steps performed by the remote device according to another exemplary embodiment.
Figure 5:
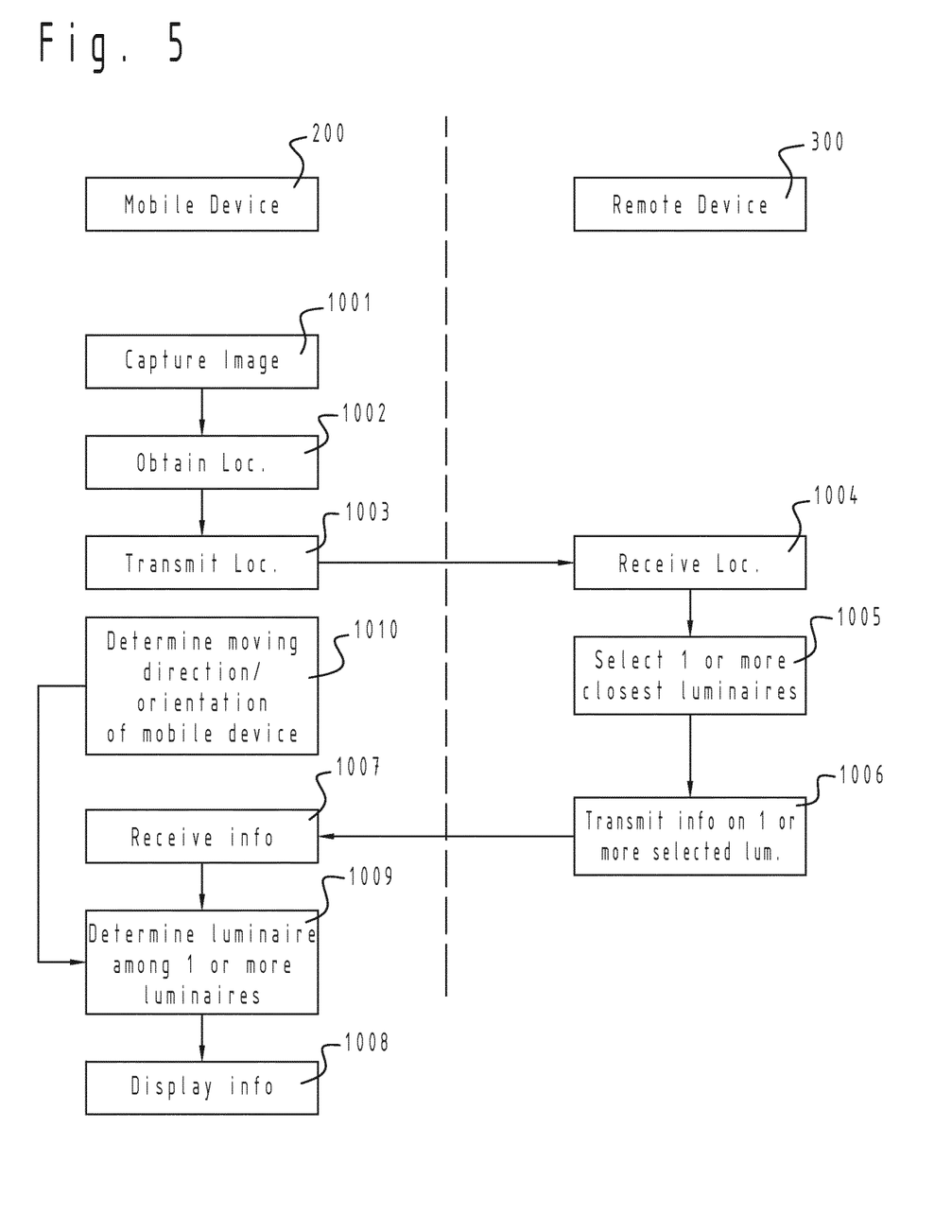
FIG. 5 is a schematic diagram illustrating the method steps performed by the mobile device and the method steps performed by the remote device according to yet another exemplary embodiment.

FIGS. 4 and 5 illustrate both the method steps performed by the mobile device and the method steps performed by the remote device, according to two other exemplary embodiments. Steps 1001 to 1007 of FIGS. 4 and 5 are the same as those described in connection with FIG. 3.

When information about more than one luminaire is received in step 1007, there may be a further determining step 1009 between steps 1007 and 1008, in order to determine which luminaire of the one or more luminaires corresponds to the luminaire in the captured image. This determining may be based on further measured or sensed parameters such as the moving direction and/or the orientation of the mobile device as illustrated in step 1010 of FIG. 5, and/or may be based on information in the captured image, e.g. via image processing techniques, as illustrated in FIG. 4. Said image processing techniques may recognize any one of the following: a shape of the luminaire, dimensions of the luminaire, a distance from the mobile device 200 to the luminaire, a color of the luminaire, a brand of the luminaire, a change of light intensity such as a blink or a flashing pattern of a light source of the luminaire, a serial number of the luminaire, a quick response (QR) code on a housing or support pole or pole module of the luminaire, etc. According to further developed embodiments, both the moving direction and/or the orientation of the mobile device and the information in the captured image may be used in order to determine which luminaire of the one or more luminaires corresponds to the luminaire in the captured image. For example, in connection with FIG. 1 the third luminaire on the other side of the street may be easily distinguished from the two other luminaires on the same side of the street based on the moving direction and/or the orientation of the mobile device 200. Indeed, the GPS coordinates may be very close for the three luminaires illustrated in FIG. 1. The orientation of the mobile device 200 may be acquired thanks to e.g. a gyroscope, a digital compass, a level, an accelerometer, a proximity detector (RF ID tag, short-range radio receiver, IR detector) embedded in the mobile device 200. The orientation of the mobile device 200 relative to the earth surface may be determined e.g. via a compass heading of the camera 230 and/or by determining one or more rotation angles of the mobile device 200 relative to the earth's surface.

In the embodiments of FIGS. 3-5, the determining step 1009 is done in the mobile device 200. However, in other embodiments, the determining step 1009 or a portion of the determining step 1009 may be done in the remote device 300. In these embodiments, the mobile device may send not only localization information to the remote device 300, but also other information useful for selecting the closest luminaire to the mobile device. Such other useful information may include any one or more of the following: the captured image, a moving direction and/or an orientation of the mobile device 200, etc. The selecting in step 1005 may then be further based on the additionally received information.

It is noted that the camera 230 of the mobile device 200 may be configured to capture video images, in which case a plurality of images may be considered to derive information from the images. It is also noted that the meaning of the capturing of an image includes taking a picture or a video of the luminaire, as well as pointing the camera 230 towards the luminaire in order to obtain a live feed.

Whilst the principles of the invention have been set out above in connection with specific embodiments, it is to be understood that this description is merely made by way of example, and not as a limitation of the scope of protection, which is determined by the appended claims.

The invention claimed is:

1. A method for obtaining information about a luminaire of a plurality of luminaires, using a mobile device with a display, a camera, a localization unit and a wireless communication means, said method comprising the following steps performed by the mobile device:
- capturing an image of the luminaire using the camera and displaying said image of the luminaire on the display;
- obtaining localization information of the mobile device using the localization unit;
- transmitting the localization information to a remote device storing information of the plurality of luminaires;
- receiving from said remote device information related to one or more luminaires selected by the remote device based on the localization information;
- displaying on the display of the mobile device luminaire data of the luminaire in the captured image based on the received information; and
- determining, based on the received information related to one or more luminaires, and based on the captured image, which luminaire of the one or more luminaires corresponds to the luminaire in the captured image, wherein the displaying comprises displaying luminaire data of the determined luminaire.

2. The method according to claim 1, wherein the displaying comprises displaying the luminaire data as an overlay on the captured image.

3. The method according to claim 1, further comprising determining at least one of a moving direction and an orientation of the mobile device, and determining based on the at least one of the moving direction and the orientation and the received information related to one or more luminaires, which luminaire of the one or more luminaires corresponds to the luminaire in the captured image, and wherein the displaying comprises displaying luminaire data of the determined luminaire.

4. The method according to claim 1, wherein the information of one or more luminaires comprises any one or more of the following for each luminaire thereof: an identification, an operating time, a type, a number or type of light emitting elements in the luminaire, a driver type used in the luminaire, a dimmer type, failure information, a dimming profile in function of time, lumen data, localization coordinates, an optical element type, a light distribution of the luminaire, diagnostics or operating status data with respect to a component of the luminaire, data sensed by a sensor of the luminaire, or a time stamp associated with any one or more of the above-mentioned information.

5. The method according to claim 1, wherein the mobile device is any one of the following: a smartphone, tablet, laptop, netbook, e-reader, smart watch, or a wearable device.

6. The method according to claim 1, wherein the remote device is any one of the following: a server, a controller, a controller within the luminaire, or a controller in a neighboring luminaire at a distance of the luminaire.

7. A non-transitory computer program product comprising computer-executable instructions to perform the method, when the instructions are executed by a computer, of claim 1.

8. A mobile device encoding a machine-executable program of instructions to perform any one of the steps of the method of claim 1, when the program is run on a computer.

9. The method according to claim 1, further comprising: determining, using image processing techniques, based on the received information related to one or more luminaires, and based on the captured image, which luminaire of the one or more luminaires corresponds to the luminaire in the captured image, wherein the displaying comprises displaying luminaire data of the determined luminaire.

10. The method according to claim 9, wherein the image processing techniques comprise recognizing any one of the following: a shape of the luminaire, dimensions of the luminaire, a distance from the mobile device to the luminaire, a color of the luminaire, a brand of the luminaire, a change of light intensity such as a blink or a flashing pattern of a light source of the luminaire, a serial number of the luminaire, or a quick response (QR) code on a housing or support pole or pole module of the luminaire.

11. The method according to claim 1, further comprising transmitting by the mobile device to the remote device information that the luminaire displayed on the mobile device is defective.

12. A method for obtaining information about a luminaire of a plurality of luminaires, using a remote device capable of communicating with a mobile device with a display, a camera and a localization unit, said method comprising the following steps performed by the remote device:
- storing information of the plurality of luminaires together with localization information for each luminaire of the plurality of luminaires;
- receiving localization information of the mobile device;
- selecting information related to one or more luminaires of the plurality of luminaires based on the received localization information;
- transmitting the selected information to the mobile device; and
- receiving from the mobile device a captured image of the luminaire, wherein the selecting comprises: determining, based on the received localization information of the mobile device, and based on the received captured image from the mobile device, which luminaire of the one or more luminaires corresponds to the luminaire in the captured image, and wherein the transmitting comprises transmitting information related to the determined luminaire to the mobile device.

13. The method according to claim 12, wherein the selecting comprises selecting one or more luminaires which are closest to the mobile device.

14. A controller or server storing computer-executable instructions for performing the method of claim 12, when the program is run on the controller or server.

15. The method according to claim 12, wherein the information of one or more luminaires comprises any one or more of the following for each luminaire thereof: an identification, an operating time, a type, a number or type of light emitting elements in the luminaire, a driver type used in the luminaire, a dimmer type, failure information, a dimming profile in function of time, lumen data, localization coordinates, an optical element type, a light distribution of the luminaire, diagnostics or operating status data with respect to a component of the luminaire, data sensed by a sensor of the luminaire, or a time stamp associated with any one or more of the above-mentioned information.

16. The method according to claim 12, wherein the mobile device is any one of the following: a smartphone, tablet, laptop, netbook, e-reader, smart watch, or a wearable device; and wherein the remote device is any one of the following: a server, a controller, a controller within the luminaire, or a controller in a neighboring luminaire at a distance of the luminaire.

17. The method according to claim 12, wherein the selecting comprises determining, using image processing techniques, based on the received localization information of the mobile device, and based on the received captured image from the mobile device, which luminaire of the one or more luminaires corresponds to the luminaire in the captured image, and wherein the transmitting comprises transmitting information related to the determined luminaire to the mobile device.

18. The method according to claim 17, wherein the image processing techniques comprise recognizing any one of the following: a shape of the luminaire, dimensions of the luminaire, a distance from the mobile device to the luminaire, a color of the luminaire, a brand of the luminaire, a change of light intensity such as a blink or a flashing pattern of a light source of the luminaire, a serial number of the luminaire, or a quick response (QR) code on a housing or support pole or pole module of the luminaire.

19. A method for obtaining information about a luminaire of a plurality of luminaires, using a remote device capable of communicating with a mobile device with a display, a camera, and a localization unit, said method comprising the following steps performed by the remote device:

storing information of the plurality of luminaires together with localization information for each luminaire of the plurality of luminaires;

receiving localization information of the mobile device;

selecting information related to one or more luminaires of the plurality of luminaires based on the received localization information;

transmitting the selected information to the mobile device; and receiving from the mobile device at least one of a moving direction and an orientation of the mobile device, wherein the selecting comprises: determining, based on the received localization information of the mobile device, and based on the received at least one of the moving direction and the orientation of the mobile device, which luminaire of the one or more luminaires corresponds to the luminaire in the captured image, and wherein the transmitting comprises transmitting information related to the determined luminaire to the mobile device.

* * * * *